United States Patent [19]

Milne

[11] Patent Number: 4,894,783

[45] Date of Patent: Jan. 16, 1990

[54] APPARATUS FOR DETECTING THE PASSAGE OF MULTIPLE SUPERPOSED SHEETS ALONG A FEED PATH

[75] Inventor: Douglas L. Milne, West Ferry, Scotland

[73] Assignee: NCR Corporation, Dayton, Ohio

[21] Appl. No.: 245,200

[22] Filed: Sep. 16, 1988

[30] Foreign Application Priority Data

Jun. 2, 1988 [GB] United Kingdom ................. 8813025

[51] Int. Cl.[4] .......................... G06F 15/20; B65H 7/12

[52] U.S. Cl. .................................... 364/479; 209/534; 271/263; 364/563; 902/16

[58] Field of Search ............... 364/478, 479, 469, 507, 364/563; 209/534; 902/16, 17; 271/263; 235/475–477, 379

[56] References Cited

U.S. PATENT DOCUMENTS

| | | | |
|---|---|---|---|
| 4,154,437 | 5/1979 | Butcheck et al. | 271/6 |
| 4,159,782 | 7/1979 | Swartzendruber | 221/1 |
| 4,168,058 | 9/1979 | Granzow et al. | 271/5 |
| 4,398,711 | 8/1983 | Horst et al. | 271/263 |
| 4,426,785 | 1/1984 | Loftus et al. | 33/147 L |
| 4,462,587 | 7/1984 | Graef et al. | 271/263 |
| 4,491,929 | 1/1985 | Ikoma et al. | 364/563 |
| 4,815,015 | 3/1989 | Milne | 364/563 |

FOREIGN PATENT DOCUMENTS

| | | |
|---|---|---|
| 0186442 | 12/1985 | European Pat. Off. . |
| WO82/01698 | 5/1982 | PCT Int'l Appl. . |
| 2001038A | 7/1978 | United Kingdom . |

OTHER PUBLICATIONS

U.S. Serial No. 094,986, filed Sep. 10, 1987, assigned to NCR Corporation, entitled "Apparatus for Detecting the Passage of Multiple Superposed Sheets Along a Feed Path", Douglas L. Milne; Pat. No. 4,815,015.

*Primary Examiner*—Joseph Ruggiero
*Attorney, Agent, or Firm*—Wilbert Hawk, Jr.; Albert L. Sessler, Jr.

[57] ABSTRACT

A multiple sheet detection apparatus includes first and second cooperating rollers (12, 14), the second roller (14) being movable away from the first roller (12) in response to the passage of a single or multiple sheet between the rollers (12, 14). Voltage generating means (42) produce an output voltage which varies linearly with movement of the axis of the second roller relative to the axis of the first roller (12). Data processing means sample this voltage a predetermined number of times over one complete revolution of the first roller (12), first with no sheet present and then with a single or multiple sheet passing between the rollers (12, 14), to produce first and second values which are respectively representative of the sums of the voltages sampled during each such revolution. The first value is subtracted from the second value to produce a third value on the basis of which the number of sheets corresponding to the second value is determined.

10 Claims, 5 Drawing Sheets

APPARATUS FOR DETECTING THE PASSAGE OF MULTIPLE SUPERPOSED SHEETS ALONG A FEED PATH

BACKGROUND OF THE INVENTION

This invention relates to an apparatus for detecting the passage of multiple superposed sheets along a feed path. The invention has application, for example, to an apparatus for detecting the passage of superposed currency notes in a cash dispensing mechanism of an automated teller machine (ATM).

In a cash dispensing mechanism, it is important to provide a simple and reliable means for detecting when a currency note has become superposed on another in a path of travel from a currency supply means to a note exit slot, since such superpositioning may produce an undesirable result such as the dispensing of an excessive amount of money. For convenience, two or more sheets or notes which have become disposed in a superposed relationship will hereinafter be referred to as a multiple sheet or a multiple note.

One known type of apparatus for detecting the passage of multiple notes along a feed path employs a note thickness sensing mechanism through which notes are fed in operation and which incorporates a gauging roller. In the event of a multiple note (or an excess thickness note) passing through the sensing mechanism, the axis of the gauging roller is displaced by an amount such that a note rejecting means is actuated, actuation of the rejecting means causing the notes or note to be diverted into a reject hopper. A problem experienced with known apparatuses of this type is that such apparatus may not distinguish between multiple notes and a single note having a localized increase in thickness, brought about for example by a crease or fold in the note or by the attachment thereto of extraneous matter such as adhesive tape. As a result, there is a tendency for such apparatus to reject an excessive number of notes. The use of such apparatus in a cash dispensing mechanism of an ATM would tend to increase maintenance costs, since the rejection of an excessive number of notes would decrease the period of time between successive replenishments of the machine with currency notes.

An apparatus which is intended to overcome the aforementioned problem is disclosed for example in U.K. Patent Application No. 2,001,038A. A thickness sensor including a pair of gauging rollers is arranged to gauge a portion of a currency note and to generate a digital signal in response to note thickness, for example a logic 1 signal in response to a multiple note thickness and a logic 0 signal in response to a single note thickness. The digital output of the thickness sensor is applied to an integrator circuit which integrates this output over substantially the entire length of the gauged portion of the note. The output of the integrator circuit is compared with a reference signal in order to determine if the gauged note is a multiple note or a single note. Although this known apparatus is able to distinguish between a multiple note and a single note having localized areas of increased thickness that might be caused by dirt or creases, the apparatus is not able to determine the number of notes being sensed at any instant. For example, the apparatus is not able to distinguish between two superposed notes and three superposed notes.

Another apparatus which is intended to overcome the aforementioned problem is disclosed in U.S. patent application, Ser. No. 094,986, U.S. Pat. No. 4,815,015 filed Sept. 10, 1987, which issued on Mar. 21, 1989, as U.S. Pat. No. 4,815,015 by the inventor of the present application, and assigned to the assignee of the present application. In that application, an apparatus for detecting the passage of superposed sheets along a feed path includes first and second cooperating rollers, the second roller being movable away from the first roller in response to the passage of a single sheet or multiple sheets between the rollers. The first roller has a diameter twice that of the second roller. Voltage generating means produces an output voltage which varies linearly with movement of the axis of the second roller relative to the axis of the first roller. This voltage is integrated over one complete revolution of the first roller first with no sheet present and then with a single sheet or multiple sheets passing between the rollers to produce first and second values, respectively. The first value is subtracted from the second value to produce a third value on the basis of which the number of sheets corresponding to the second value is determined.

SUMMARY OF THE INVENTION

According to one embodiment of the invention there is provided, in an apparatus for detecting the passage of superposed sheets along a feed path, including first and second cooperating rollers, said first roller having a fixed axis of rotation, and the diameter of one of said rollers being equal to, or a multiple of, the diameter of the other roller, means for feeding sheets along said feed path between said rollers, and means for mounting said second roller so that its axis is movable relative to that of said first roller and so that it is biased towards said first roller to enable said second roller to be displaced away from said first roller in response to a single or multiple sheet passing between said first and second rollers, the improvement comprising voltage generating means associated with said second roller and arranged to produce an output voltage which varies linearly with movement of the axis of said second roller towards or away from the axis of said first roller, analog-to-digital converter means to which said output voltage is applied, pulse generating means for generating timing pulses in timed relationship with the revolution of said rollers, and data processing means connected to the output of said converter means and to the output of said pulse generating means, said data processing means being arranged to perform the following steps: (a) sampling the value of said output voltage, as represented by the output of said converter means, a predetermined number of times for one complete revolution of said one of said rollers when no sheet is passing between said rollers, (b) storing a first digital value representative of the sum of the values of said output voltage sampled in step (a), (c) sampling the value of said output voltage, as represented by the output of said converter means, said predetermined number of times for one complete revolution of said one of said rollers when a single or multiple sheet is passing between said rollers, (d) storing a second digital value representative of the sum of the values of said output voltage sampled in step (c), and (e) subtracting said first digital value from said second digital value to produce a third digital value on the basis of which a determination is made of the number of sheets which passed between said rollers in step (c).

It should be understood that the ability of an apparatus in accordance with the invention to determine the number of sheets making up a detected multiple sheet is of importance, since when it is used in a cash dispensing mechanism, for example, it enables a multiple note to be counted as the appropriate number of notes and then dispensed to a customer.

It is an object of the invention to provide an apparatus for detecting a multiple note, which apparatus is of simple construction and can determine the actual number of notes making up a detected multiple note.

With this and other objects, which will become apparent from the following description, in view, the invention includes certain novel features of construction and combinations of parts, a preferred form of which is hereinafter described with reference to the drawings which accompany and form a part of this specification.

DETAILED DESCRIPTION OF THE PREFERRED EMBODIMENT

Figure 1:
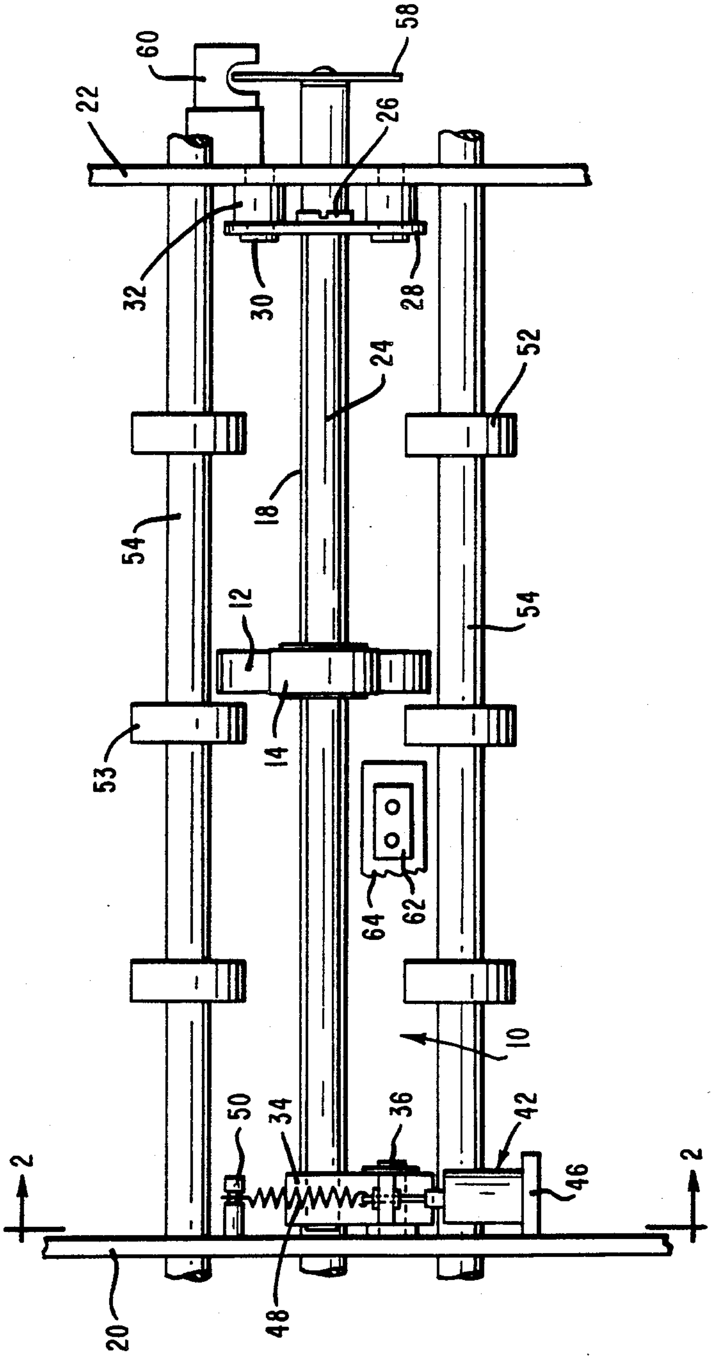
FIG. 1 is a front elevational view of a note sensing mechanism utilized in a multiple note detect apparatus in accordance with the present invention.
Figure 2:
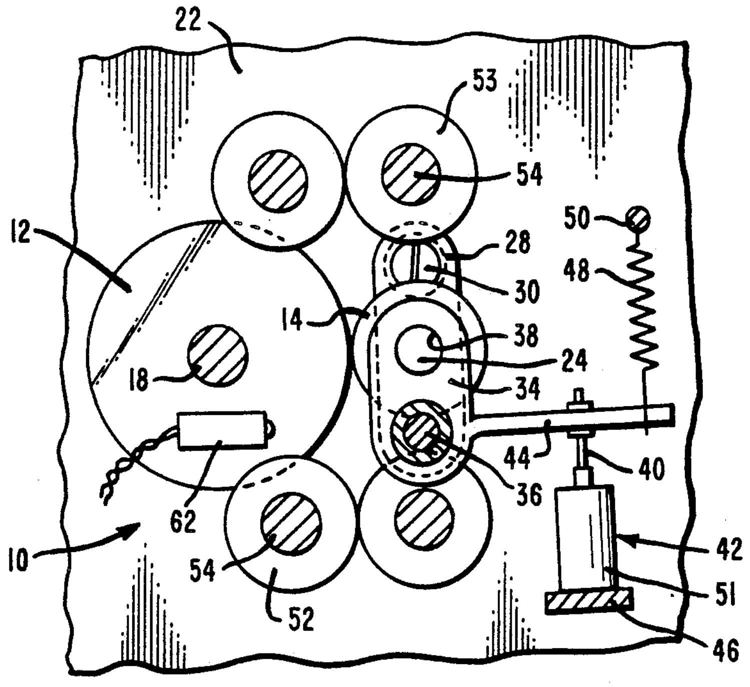
FIG. 2 is a part sectional side elevational view of the note sensing mechanism of FIG. 1 taken along the line 2—2 of FIG. 1.

Referring to FIGS. 1 and 2, a note sensing mechanism 10 of a multiple note detect apparatus in accordance with the invention includes a steel roller 12 having a fixed axis of rotation and a cooperating steel roller 14 having a movable axis of rotation, the diameter of the roller 12 being exactly twice that of the roller 14. As will be explained later, the roller 14 is resiliently urged into engagement with the roller 12, and currency notes 16 (see FIG. 3) are fed in operation between the rollers 12 and 14, with the long dimension of each note 16 extending parallel to the axis of the roller 12.

The roller 12 is secured on a drive shaft 18 which extends between, and is rotatably mounted with respect to, a pair of side frame members 20 and 22, and the roller 14 is rotatably mounted on a rigid rod 24 which, in the absence of any currency note 16 between the rollers 12 and 14, extends parallel to the drive shaft 18. The roller 14 is caused to rotate in operation by virtue of its resilient engagement with the roller 12 or with a note passing between the rollers 12 and 14. The right hand end (with reference to FIG. 1) of the rod 24 is secured by means of a screw 26 to a narrow plate 28 of plastic material which is disposed generally parallel to the side frame member 22. The ends of the plate 28 are secured to the member 22 by means of bolts 30, the plate 28 being spaced from the inner surface of the member 22 by spacer members 32.

A connector member 34 is pivotally mounted on a stud 36 secured to the inner surface of the said frame member 20. That end of the rod 24 remote from the plate 28 is supported by the connector member 34, this end passing through, and being a tight fit with respect to, a circular aperture 38 formed in the connector member 34 above the stud 36. The connector member 34 is connected to a vertically extending armature 40 of a linear variable differential transformer (LVDT) 42 by means of an arm 44 which is formed integral with the connector member 34 and which extends therefrom in a generally horizontal direction. The LVDT 42 is mounted on a bracket 46 secured to the side frame member 20, and the free end of the arm 44 is connected by means of a spring 48 to a stud 50 secured to the member 20, the spring 48 serving to urge the assembly of the connector member 34 and the arm 44 in a counterclockwise direction (with reference to FIG. 2) about the stud 36. The plate 28 has a certain amount of inherent flexibility, and by virtue of this flexibility the rod 24 is pivotable to some extent about a point substantially at the center of the plate 28. Normally, the roller 14 is urged into engagement with the roller 12 under the action of the spring 48. Upon one or more currency notes passing between the rollers 12 and 14, pivotal movement of the rod 24 is brought about in a direction such that the left hand end (with reference to FIG. 1) of the rod 24 is moved away from the drive shaft 18. This pivotal movement of the rod 24 brings about pivotal movement of the connector member 34 in a clockwise direction (with reference to FIG. 2) about the stud 36 against the action of the spring 48, and in turn this movement of the connector member 34 brings about a downward movement of the armature 40 of the LVDT 42 by means of the arm 44. Upon the currency note or notes leaving the nip of the rollers 12 and 14, the spring 48 returns the rod 24 to its home position, with the roller 14 in engagement with the roller 12, and also moves the armature 40 in an upward direction back to its home position via the arm 44. It should be understood that the nature of the guidance of the armature 40 within the housing 51 of the LVDT 42 permits the angular movement of the arm 44 to be translated into up and down movement of the armature 40 over the small extent of pivotal movement of the rod 24 encountered in operation.

Figure 5:
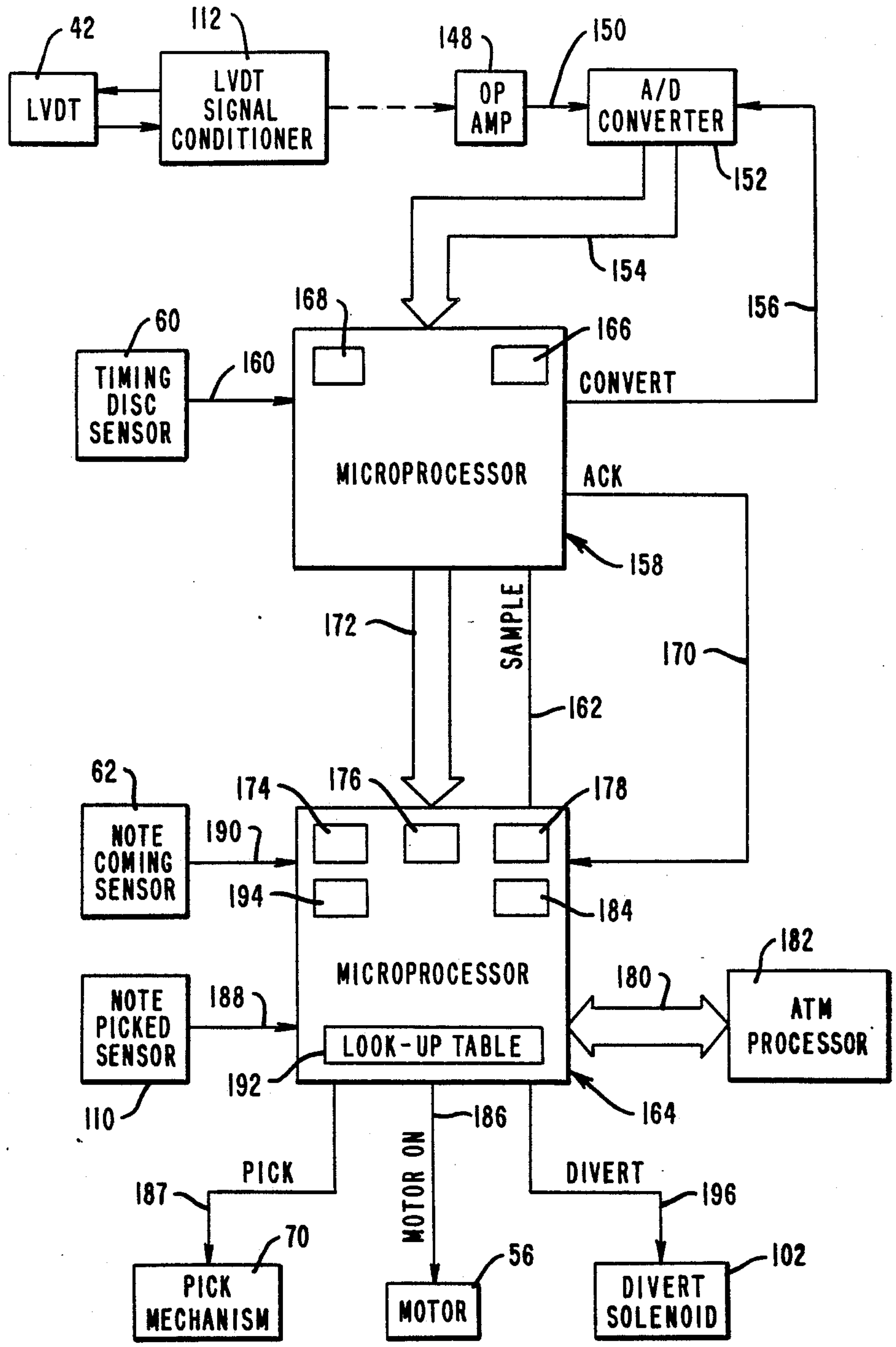
FIG. 5 is a block circuit diagram of the multiple note detect apparatus and associated parts of the cash dispensing mechanism.

Movement of currency notes in an upward direction between the rollers 12 and 14 is brought about by means of pairs of cooperating rubber feed rolls 52 and 53 mounted on shafts 54, the shafts 54 extending between, and being rotatably mounted with respect to, the side frame members 20 and 22. The feed rolls 52 and 53 and the drive shaft 18 for the roller 12 are driven via transmission means (not shown) by an electric motor 56 (FIG. 5). As shown in FIGS. 1 and 2, the feed rolls 52 are positioned beneath the rollers 12 and 14, and the feed rolls 53 are positioned above the rollers 12 and 14.

A timing disc 58 is secured to the end of the drive shaft 18 projecting beyond the side frame member 22, the disc 58 carrying a series of 90 radially extending black regions (not seen) equally spaced around the axis of the shaft 18, each successive pair of black regions being separated by a clear region having the same angular width as each black region. The disc 58 cooperates with an optical sensor 60 mounted on the side frame member 22, and in operation the sensor 60 generates a series of timing pulses in response to the sensing of the marks carried by the disc 58. The sensor 60 generates a timing pulse for each transition which it senses between black and clear regions on the timing disc 58, and so a series of 180 equally spaced timing pulses are generated by the sensor 60 for each complete revolution of the roller 12. A further optical sensor 62, arranged to sense the approach of a currency note to the nip of the rollers 12 and 14, is mounted on a bracket 64 secured to the side frame member 20.

Figure 3:
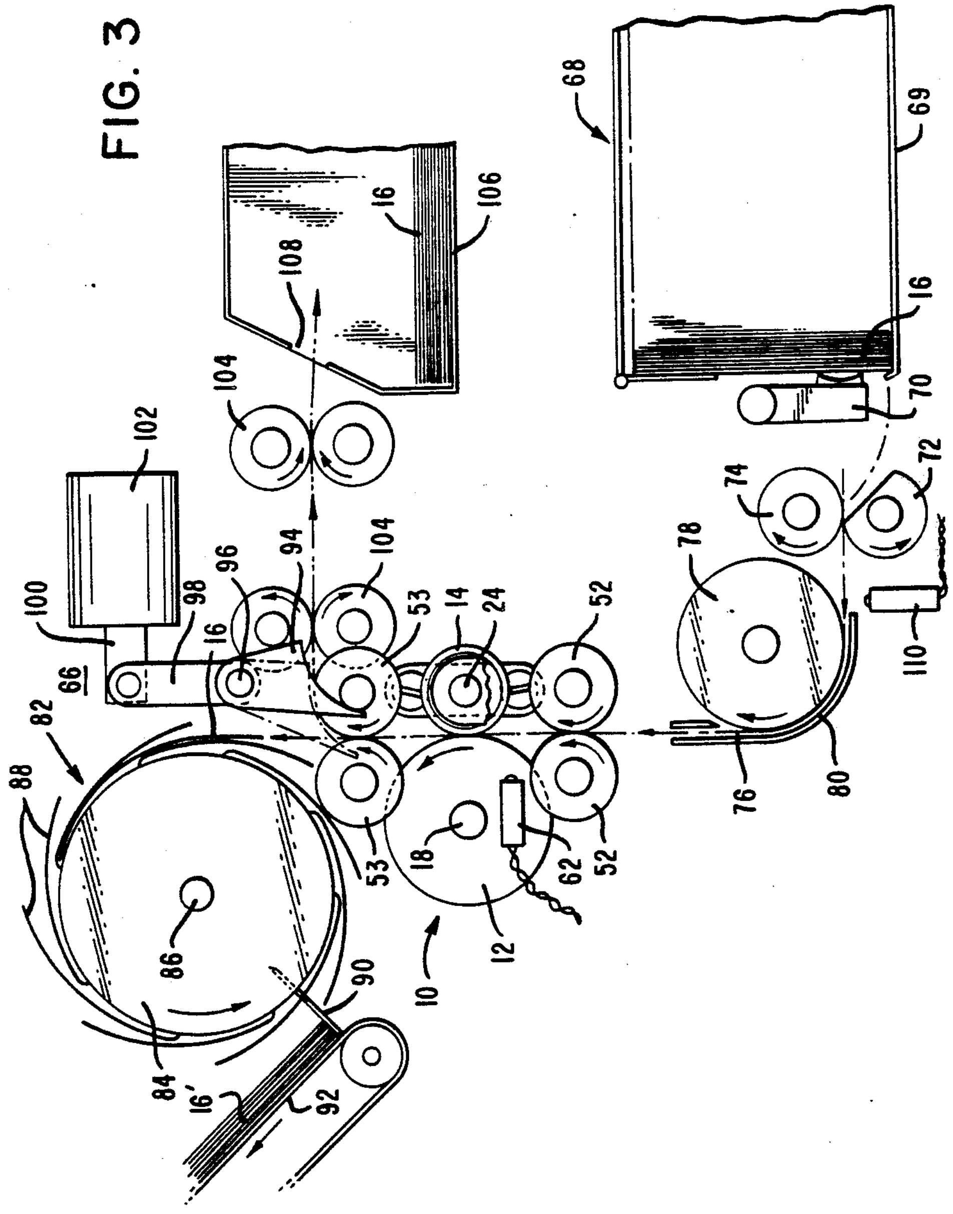
FIG. 3 is a schematic view of part of a cash dispensing mechanism incorporating the note sensing mechanism of FIGS. 1 and 2.

Referring now to FIG. 3, the note sensing mechanism 10 is included in a cash dispensing mechanism 66 of an ATM. The cash dispensing mechanism 66 includes a currency cassette 68 arranged to contain a stack of currency notes 16 of the same predetermined denomination, with corresponding long edges thereof resting on the base 69 of the cassette 68. The cassette 68 is associated with a pick mechanism 70. When one or more currency notes 16 are to be dispensed from the cassette 68 in the course of a cash dispensing operation, the pick mechanism 70 is pivoted in a clockwise direction so as to draw the lower portion of the first note 16 in the stack out of the cassette 68 and into a position where the leading edge of this note is gripped between the curved periphery of pick roll means 72 of D-shaped cross-section and the periphery of cooperating roll means 74. The first note is fed out of the cassette 68 by the roll means 72 and 74, and is guided along a feed path 76 by a roller 78 and guide means 80 until the leading edge of the note is gripped by the feed rolls 52.

Each currency note 16 extracted from the cassette 68 is fed by the feed rolls 52 to the nip of the rollers 12 and 14, and after passing between the rollers 12 and 14 the note 16 is fed in normal operation by the feed rolls 53 to a conventional stacking wheel 82 which is arranged to rotate continuously in operation in a counterclockwise direction. The stacking wheel 82 comprises a plurality of stacking plates 84 spaced apart in parallel relationship along the stacker wheel shaft 86, each stacking plate 84 incorporating a series of curved tines 88. The stacking wheel 82 is associated with a stripper plate 90 which is in the form of a comb-like structure, and the tines 88 of each stacking plate 84 are arranged to pass between adjacent teeth of the stripper plate 90. In operation, each currency note 16 fed by the feed rolls 53 to the stacking wheel 82 enters between adjacent tines 88 of the stacking plates 84, as shown in FIG. 3, and is carried partly around the axis of the stacking wheel 82, the note 16 being stripped from the stacking wheel 82 by the stripper plate 90 and being stacked against a normally stationary belt 92 with a long edge of the note 16 resting against the stripper plate 90. When a bundle of notes 16′ (or possibly a single note only) to be dispensed to a user of the ATM in response to a cash withdrawal request has been stacked on the belt 92, the belt 92 is operated by separate motor (not shown) so as to transport the bundle of notes 16′ towards a cash delivery slot (not shown).

A divert gate 94 mounted on a shaft 96 is positioned above the note sensing mechanism 10 in association with the feed rolls 53. One end of an arm 98 is secured to the shaft 96, the other end of the arm 98 being pivotally coupled to an armature 100 associated with a solenoid 102. As will be explained later, the solenoid 102 is arranged to be energized in response to the multiple note detect apparatus detecting that an invalid note or a multiple note has passed through the note sensing mechanism 10. The arrangement is such that with the solenoid 102 in a non-energized condition the divert gate 94 is in the position shown in solid outline in FIG. 3, out of the feed path 76 of currency notes 16 from the guide roller 78 to the stacking wheel 82. Upon the solenoid 102 being energized, the armature 100 causes the divert gate 94 to be pivoted via the arm 98 and shaft 96 in a clockwise direction into the position shown in chain outline in FIG. 3 in which the divert gate 94 is positioned in the feed path 76. With the divert gate 94 in this last-mentioned position, the divert gate 94 serves to guide invalid or multiple notes to feed rolls 104 which feed the notes to a reject bin 106, the notes being deposited into the bin through a slot 108.

In addition to the optical sensor 62 which is arranged to sense the approach of a currency note 16 to the nip of the rollers 12 and 14, the cash dispensing mechanism 66 also includes an optical sensor 110 which is arranged to sense when a currency note 16 has been extracted from the cassette 68 by the pick mechanism 70 and associated roll means 72 and 74.

Figure 4:
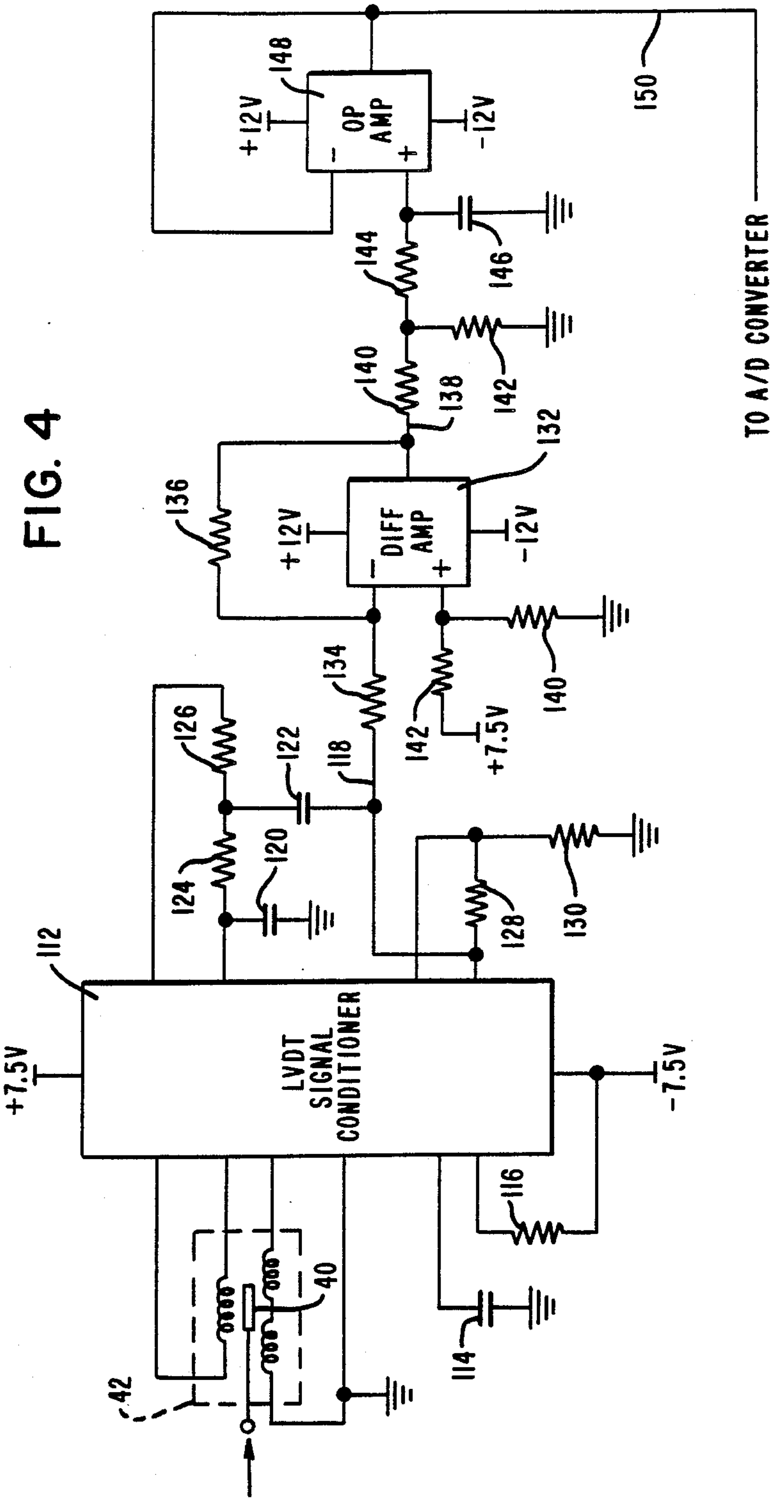
FIG. 4 is a circuit diagram of means for generating an output voltage which varies in accordance with the thickness of a sensed note.

Referring now to FIG. 4, the LVDT 42 is connected to an LVDT signal conditioner 112 such as model NE 5521 available from Mullard Limited, London. As is known, the signal conditioner 112 is in the form of an integrated circuit incorporating a low distortion, amplitude stable sine wave oscillator with programmable frequency for driving the primary winding of the LVDT 42, a synchronous demodulator for converting the LVDT output amplitude and phase to position information, and an output amplifier for providing amplification and filtering of the demodulated signal. A capacitor 114 and a resistor 116 set the modulation frequency of the primary winding of the LVDT 42 at 14 KHz. The output of the signal conditioner 112 appears on an output line 118, the demodulator output of the signal conditioner 112 being connected to the output line 118 via a low pass filter comprising capacitors 120 and 122 and resistors 124 and 126 connected as shown in FIG. 4, and the gain of the output of the signal conditioner 112 being set by resistors 128 and 130. In the embodiment described, the output voltage appearing on the line 118 changes from +5 volts to −5 volts as the armature 40 moves into the LVDT 42 from its uppermost position to its lowermost position.

The output line 118 of the signal conditioner 112 is connected to the negative terminal of a differential amplifier 132 via a resistor 134; this terminal being connected via a resistor 136 to the output line 138 of the amplifier 132. The positive terminal of the amplifier 132 is connected to ground via a resistor 140 and is connected to a +7.5 volts supply via a resistor 142. The differential amplifier 132 serves to change the +5 volts to −5 volts output of the signal conditioner 112 into a 0 to +10 volts swing on the line 138. The line 138 is connected via a voltage divider comprising resistors 140 and 142 and an RC filter comprising a resistor 144 and a capacitor 146 to the positive terminal of an operational amplifier 148, the negative terminal of which is connected to the output line 150 of the amplifier 148. The voltage divider 140, 142 serves to limit the output swing of the amplifier 132 to a 0 to +5 volts swing, and the combination of the RC filter 144, 146 and the operational amplifier 148 serves as a low pass filter to remove the effect of the low frequency mechanical oscillations of the LVDT armature 40 brought about by the return spring 48 (FIGS. 1 and 2). Thus, it will be appreciated that the signal appearing on the line 150 is a DC voltage between 0 and +5 volts which varies linearly with movement of the armature 40 into and out of the LVDT 42 and which therefore also varies linearly with angular movement of the axis of the roller 14 towards and away from the axis of the roller 12 (FIGS. 1–3).

Referring now also to FIG. 5, the output line 150 is connected to a first input of an analog-to-digital (A/D) converter 152 which serves to convert the voltage appearing on the line 150 to an 8 bit digital word the bits of which appear on the output lines 154 of the A/D converter 152. A control line 156 is connected to the A/D converter 152, and the operation of the converter 152 is controlled by a low level control pulse CONVERT applied to the line 156. An analog-to-digital conversion takes place in response to the appearance of the pulse CONVERT on the line 156, this pulse having a duration of approximately 50 ms. The output lines 154 are connected to a microprocessor 158, such as an 8049 microprocessor available from Intel Corporation, the microprocessor 158 being arranged to process the information appearing on the lines 154 in a manner to be described later.

The output of the timing disc sensor 60 is connected to the microprocessor 158 over a line 160. As previously mentioned, the sensor 60 generates a series of 180 timing pulses for each complete revolution of the roller 12. In operation, the microprocessor 158 receives low level signals SAMPLE over a line 162 from a further microprocessor 164. Prior to receiving a signal SAMPLE, the microprocessor 158 has stored the number 180 (i.e. the number of timing pulses generated for one revolution of the roller 12) in an internal memory location 166, and the contents of a further internal memory location 168 have been set to zero. In response to receipt of a signal SAMPLE, the microprocessor 158 sends a low level pulse ACK to the microprocessor 164 over a line 170 by way of acknowledgment. Following receipt by the microprocessor 158 of the signal SAMPLE, each timing pulse applied to the microprocessor 158 over the line 160 decrements the contents of the memory location 166 by one and causes a control pulse CONVERT to be applied to the A/D converter 152 over the line 156. The application of each pulse CONVERT to the A/D converter 152 causes the A/D converter 152 to apply to the microprocessor 158 an 8 bit digital number representing the value of the voltage appearing on the line 150 at the instant pulse CONVERT is applied to the A/D converter 152, this number being added to the number (which initially is zero) contained in the memory location 168. When the contents of the memory location 166 have been reduced to zero, the application of further control pulses CONVERT to the A/D converter 152 is inhibited, and at this time the memory location 168 contains a 16 bit number representing the sum of 180 samples of the output of the A/D converter 152, that is to say the sum of 180 samples of the value of the voltage appearing on the line 150 in the course of one complete revolution of the roller 12.

The microprocessor 164 may also be an 8049 microprocessor available from Intel Corporation. At the commencement of a cash dispensing operation, the microprocessor 164 will apply a signal SAMPLE to the microprocessor 158 over the line 162 prior to any currency note 16 reaching the nip of the rollers 12 and 14. It will be appreciated that, in response to this signal SAMPLE, the microprocessor 158 will cause to be stored in the memory location 168 a 16 bit number representing the sum of 180 samples of the value of the voltage on the line 150 in the course of one complete revolution of the roller 12 when no currency note 16 is passing between the rollers 12 and 14. An 8 bit digital number representing the 8 most significant bits (most significant byte) of the number stored in the memory location 168 is then applied to the microprocessor 164 over a communications bus 172 and stored in an internal memory location 174 of the microprocessor 164. At this stage the contents of the memory location 168 are reset to zero, and the number 180 is stored in the memory location 166. It should be understood that the number stored in the memory location 174 is a number representing the average value of the voltage appearing on the line 150 in the course of one complete revolution of the roller 12, when no currency note 16 is passing between the rollers 12 and 14.

Immediately prior to a single or multiple currency note entering the nip of the rollers 12 and 14, the microprocessor 164 applies another signal SAMPLE to the microprocessor 158. Upon receipt of this single SAMPLE, the microprocessor 158 will cause to be stored in the memory location 168 a 16 bit number representing the sum of 180 samples of the value of the voltage on the line 150 for one complete revolution of the roller 12 in the course of which the signal or multiple note passes between the rollers 12 and 14, said voltage being of increased value for the period for which the single or multiple note is present between the rollers 12 and 14. An 8 bit digital number representing the 8 most significant bits of the number stored in the memory location 168 is then applied to the microprocessor 164 over the bus 172 and stored in an internal memory location 176 of the microprocessor 164. It should be understood that the number stored in the memory location 176 is a number representing the average value of the voltage appearing on the line 150 for one complete revolution of the roller 12 when the last-mentioned single or multiple note passes between the rollers 12 and 14. Next, the microprocessor 164 subtracts the number stored in the memory location 174 from the number stored in the memory location 176 and stores the remainder in a further internal memory location 178 of the microprocessor 164.

It should be understood that as the two rollers 12 and 14 rotate with no currency note passing between them, the voltage output of the signal conditioner 112, and thus the voltage appearing on the line 150, will vary slightly due to various factors such as bearing wear and tolerances, dirt on the rollers 12 and 14 and roller eccentricity. Such voltage variation will hereinafter be referred to as roller noise. As previously mentioned, the diameter of the fixed axis roller 12 is exactly twice that of the roller 14, so that during one complete revolution of the roller 12 there will be exactly two revolutions of the smaller roller 14. Thus, all the roller noise will be generated in one revolution of the fixed axis roller 12, and this noise will be substantially repetitive from one revolution to the next. The number stored in the memory location 174 is a reference value representative of the roller noise. Since the voltage on the line 150 varies linearly with movement of the axis of the roller 14 towards or away from the axis of the roller 12, by subtracting the reference value stored in the memory location 174 from the number stored in the reference location 176, there is obtained a value (the number stored in the memory location 178) proportional to the cross sectional area of the single or multiple note which passed between the rollers 12 and 14 when the number stored in the memory location 176 was generated, the roller noise having no effect on this last-mentioned value.

It will be appreciated that the same difference value, i.e. the value stored in the memory location 178, will be obtained for two currency notes 16 passing between the rollers 12 and 14 in a fully superposed relationship as will be obtained for the same two notes 16 passing between rollers 12 and 14 in a partially overlapping relationship. Similarly, the same resulting value will be obtained for a single note 16 as for the same note 16 folded about its long axis.

In the present embodiment, the roller 12 has a circumference of 180 millimeters. Since 180 timing pulses are generated for one complete revolution of the roller 12, it will be appreciated that, when a single or multiple note is passing between the rollers 12 and 14, samples of the values of the voltage appearing on the line 150 are taken at intervals of 1 millimeter across the width of the note. In general, it is preferable that such samples should be taken at intervals of 2 millimeters or less across the width of the note.

The operation of the multiple note detect apparatus and of the associated parts of the cash dispensing mechanism 66 will now be described with particular reference to FIG. 5. This operation is controlled by the microprocessors 158 and 164, the microprocessor 164 being connected via an 8 bit bus 180 to the main ATM processor 182. When the main ATM processor 182 requests that a particular number of currency notes be dispensed by the cash dispensing mechanism 66 from the currency cassette 68 (FIG. 3) in response to a cash withdrawal request by a user of the ATM, the microprocessor 164 stores this number in an internal memory location 184. The microprocessor 164 then switches on the motor 56 by setting a control signal MOTON on a line 186 low. It should be understood that the motor 56 controls the operation of the drive shaft 18, the feed rolls 52, 53 and 104, the cooperating roll means 72, 74, the roller 78 and the stacking wheel 82.

The microprocessor 164 then applies a low level pulse SAMPLE to the microprocessor 158 over the line 162 so as to cause the microprocessor 158 to store in the memory location 168, in the manner previously described, the sum of 180 samples of the value of the roller 12 when no currency note is passing between the rollers 12 and 14. Following receipt of the low level pulse SAMPLE, the microprocessor 158 transmits a low level pulse ACK to the microprocessor 164 over the line 170, the pulse ACK serving to cause the microprocessor to terminate the pulse SAMPLE on the line 164 in readiness for the next sampling operation to be performed by the microprocessor 158. As previously described, a reference value represented by the 8 most significant bits of the number stored in the memory location 168 is stored in the memory location 174 of the microprocessor 164.

Once a reference voltage value has been stored in the memory location 174, the required number of currency notes 16 are then picked by the pick mechanism 70. This picking operation is initiated by the microprocessor 164 applying a low signal PICK to the pick mechanism 70 over a line 187, which in correct operation causes the required number of notes 16 to be picked one by one from the currency cassette 68 by the pick mechanism 70. Each pick note (which may be a multiple note if the pick mechanism 70 operates incorrectly) is detected by the sensor 110 which sends a signal to the microprocessor 164 over a line 188 advising the microprocessor 164 that a note has been picked.

The picked currency note 16 is fed by the cooperating roll means 72, 74 (FIG. 3) along the feed path 76 to the feed rolls 52, and after passing through the feed rolls 52 the leading edge of the picked note 16 is detected by the sensor 62 shortly prior to this edge entering the nip of the rollers 12 and 14. Thereupon, the sensor 62 sends a signal to the microprocessor 164 over a line 190 advising the microprocessor 164 that a currency note 16 is approaching the note sensing mechanism 10.

Upon receipt of this signal, the microprocessor 164 applies a further low level pulse SAMPLE to the microprocessor 158 over the line 162 so as to initiate a further sampling operation in respect of the value of the voltage on the line 150 for one complete revolution of the roller 12. Shortly after this sampling operation commences, the leading edge of the picked note 16 enters the nip of the rollers 12 and 14, and the trailing edge of this note leaves the nip prior to the completion of the just mentioned complete revolution of the roller 12. In the manner previously described, in the cause of this revolution of the roller 12 the microprocessor stores in the memory location 168 the sum of 180 samples of the value of the voltage appearing on the line 150, this voltage being of increased value for the period for which the picked note is passing between the rollers 12 and 14, and thereafter the eight most significant bits of the number stored in the memory location 168 are stored in the memory location 176 of the microprocessor 164. Next, the microprocessor 164 subtracts the reference value stored in the memory location 174 from the number just stored in the memory location 176 and stores the remainder in the memory location 178. The difference value stored in the memory location 178 is proportional to the cross sectional area of the picked single or multiple note which passed between the rollers 12 and 14 in the course of the last-mentioned sampling operation performed by the microprocessor 158. It should be understood that following receipt of the further low level pulse SAMPLE, the microprocessor 158 sends another low level pulse ACK to the microprocessor 164 for the purpose of terminating the pulse SAMPLE.

After the difference value proportional to the just picked single or multiple note has been stored in the memory location 178, the microprocessor 164 compares this value with the contents of a look-up table held in an internal memory location 192 of the microprocessor 164, in order to determined, if possible, the number of notes which have been picked and have passed between the rollers 12 and 14. The contents of the look-up table in the memory location 192 comprise three discrete ranges of values respectively corresponding to 1, 2 and 3 notes. If the value stored in the memory location 178 falls within any one of these ranges, then the number of notes picked, corresponding to the relevant range, is stored in an internal memory location 194 of the microprocessor 164. It will be understood that, in a normal pick operation, the pick mechanism 70 picks a single currency note 16 from the currency cassette 68 for feeding to the stacking wheel 82 (FIG. 3).

The microprocessor 198 then compares the number stored in the memory location 194 (i.e. the number of notes picked) with the number stored in the memory location 184 (i.e. the number of notes requested). If the number in the location 194 is greater than that in the location 184, then a multiple note has been picked comprising more notes than have been requested, and in this case the microprocessor 164 sends a signal DIVERT over a line 196 to the divert solenoid 102 thereby activating the solenoid 102 so as to cause the divert gate 94 to be pivoted from its normal position shown in solid outline in FIG. 3 to the position shown in chain outline. Thus, in consequence of the signal DIVERT being sent to the divert solenoid 102, the picked multiple note is diverted into the reject bin 106 (FIG. 3); thereafter, the memory locations 176, 178 and 194 are cleared and a further pick operation takes place by virtue of the low level signal PICK continuing to be present on the line 187. If the number in the location 194 is less than or equal to that in the location 184, then the picked signal or multiple note is allowed to travel on to the stacking wheel 82 for stacking on the belt 92 (FIG. 3), and the number in the location 194 is subtracted from that in the location 184, the result of the subtraction being overwritten into the location 184. The location 184 now contains the number, if any, of notes still to be picked from the cassette 68 and stacked on the belt 92. If the number now contained in the location 184 is zero, then the operation of the pick mechanism 70 is terminated, the microprocessor 164 is reset, and the cash dispensing operation is completed, in a manner to be described later. If the number contained in the location 184 is not zero, then the memory locations 176, 178 and 194 are cleared and the cash dispensing operation is continued by performing one or more additional pick operations as previously described, until such time as the number contained in the memory location 184 has been reduced to zero. In the course of the, or each additional, pick operation, the microprocessor 158 performs a sampling operation for one complete revolution of the roller 12 during which the picked note passes between the rollers 12 and 14, new values being stored in the memory locations 176 and 178 at the completion of the sampling operation.

When the number contained in the memory location 184 has been reduced to zero, the microprocessor 164 terminates the low level signal PICK on the line 187 so as to terminate the operation of the pick mechanism 70. The bundle of notes 16' stacked at this time on the belt 92 comprises the total number of notes (possibly a single note) to be dispensed to the user of the ATM. The belt 92 is then operated so as to transport the bundle of notes 16' towards the cash delivery port (not shown) for collection by the user of the ATM, and the microprocessor 164 switches off the motor 56 by terminating the low level signal MOTON, and resets the memory locations 174, 176, 178, 184 and 194 to zero. It should be understood that at the beginning of each cash dispensing operation a low level pulse SAMPLE is generated by the microprocessor 164 on the line 162, thereby causing a reference value, as previously described, to be stored in the memory location 174 prior to the first note 16 being picked by the pick mechanism 70.

Prior to a cash dispensing operation taking place, the look-up table held in the memory location 192 is established by passing a number of single notes, a number of double notes (i.e. two superposed notes) and a number of triple notes (i.e. three superposed notes) through the note sensing mechanism 10 and recording the various difference values representative of the cross sectional areas of the single or multiple notes, which difference values are obtained in the manner previously described. In a typical example of the look-up table, the range of values for a single note passing between the rollers 12 and 14 is 18 hex to 26 hex, the range of values for a double note is 38 hex to 46 hex, and the range of values for a triple note is 58 hex to 66 hex. If in the course of a pick operation the difference values stored in the memory location 178 is between or outside the ranges making up the look-up table, for example a value between 26 hex and 38 hex, this value is invalid and the microprocessor 164 sends a signal DIVERT over the line 196 to the divert solenoid 102 so as to cause the picked single or multiple note which gave rise to this invalid value to be diverted into the reject bin 106. A picked note could give rise to an invalid value if, for example, the note is torn or if the parts of the note are joined together by adhesive tape. The look-up table could be extended to include a range of values corresponding to four superposed notes, and possibly even a range of values corresponding to five superposed notes. However, it is extremely unlikely that as many as four or five notes would be picked in a single pick operation. Also, the look-up table could comprise just two ranges respectively corresponding to one and two notes.

It should be understood that the multiple note detect apparatus described above is able to count and pass on to the stacking wheel 82 overlapping double and triple notes whose overall width is greater than that of a single note, provided that such overall width is not greater than the circumference of the fixed axis roller 12 less the distance between the sensor 62 and the nip of the rollers 12 and 14. In the present embodiment, overlapping double or triple notes are treated as invalid if the sensor 62 senses that the overall width of the notes is greater than the circumference of the roller 12 less the distance between the sensor 62 and the nip of the rollers 12 and 14, and in this case the microprocessor 164 sends a signal DIVERT to the divert solenoid 102 so as to divert the overlapping notes to the reject bin 106.

The multiple note detect apparatus described above has the advantage that roller noise is compensated automatically by the utilization of the reference value generated at the beginning of each cash dispensing operation. This arrangement also allows the rollers 12 and 14 and the related bearings to be manufactured to a lower tolerance, thereby providing a reduction in manufacturing costs. Also, since picked double and triple notes can be read accurately and utilized in a cash dispensing operation (provided that the generated sensed note cross sectional values fall within the relevant ranges in the look-up table in the memory location 192), the period of time between successive replenishments of the currency cassette 68 can be increased, thereby decreasing the downtime of the ATM of which the cash dispensing mechanism 66 forms a part. Further, since the cross sectional area of the part of a picked single or multiple note passing through the nip of the rollers 12 and 14 is determined rather than the thickness of the note, a folded single note can be accurately detected as being one note and overlapping double or triple notes can be accurately detected as two or three notes respectively (provided that their overall width does not exceed a certain limit), thereby reducing still further the number of notes that are rejected unnecessarily. Another advantage of the multiple note detect apparatus described above is that the utilization of spaced apart ranges of valid sensed integration values in the look-up table in the memory location 192 enables mutilated notes to be rejected while substantially eliminating the risk of a picked double note being dispensed as a single note.

A further advantage of the multiple note detect apparatus is that its operation is not affected by possible variation in the speed of the motor 56 which drives the roller 12 and the timing disc 58. Thus, the timing disc sensor 60 generates a pulse for every two degrees of rotation of the roller 12 and the timing disc 58, irrespective of the speed at which the roller 12 and the disc 58 are rotating. In contrast, if an electronic integrator were used instead of the microprocessor 158 to generate the values stored in the memory locations 174 and 176, then these values would be dependent on the time taken for the roller 12 to complete one full revolution.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. In an apparatus for detecting the passage of superposed sheets along a feed path, including first and second cooperating rollers, said first roller having a fixed axis of rotation, and the diameter of one of said rollers being equal to, or a multiple of, the diameter of the other roller, means for feeding sheets along said feed path between said rollers, and means for mounting said second roller so that its axis is movable relative to that of said first roller and so that it is biased towards said first roller to enable said second roller to be displaced away from said first roller in response to a single or multiple sheet passing between said first and second rollers, the improvement comprising:

voltage generating means associated with said second roller and arranged to produce an output voltage which varies linearly with movement of the axis of said second roller towards or away from the axis of said first roller;

analog-to-digital converter means to which said output voltage is applied;

pulse generating means for generating timing pulses in timed relationship with the revolution of said rollers; and data processing means connected to the output of said converter means and to the output of said pulse generating means, said data processing means being arranged to perform the following steps: (a) sampling the value of said output voltage, as represented by the output of said converter means, a predetermined number of times for one complete revolution of said one of said rollers when no sheet is passing between said rollers, (b) storing a first digital value representative of the sum of the values of said output voltage sampled in step (a), (c) sampling the value of said output voltage, as represented by the output of said converter means, said predetermined number of times for one complete revolution of said one of said rollers when a single or multiple sheet is passing between said rollers, (d) storing a second digital value representative of the sum of the values of said output voltage sampled in step (c), and (e) subtracting said first digital value from said second digital value to produce a third digital value on the basis of which a determination is made of the number of sheets which passed between said rollers in step (c).

2. An apparatus according to claim 1, in which in each of steps (a) and (c) said data processing means are arranged to sample the value of said output voltage at equal angular intervals of the rotation of said one of said rollers.

3. An apparatus according to claim 2, in which in step (c), during the passage of said single or multiple sheet between said rollers, said data processing means are arranged to sample the value of said output voltage at intervals of not more than 2 millimeters along the dimension of said single or multiple sheet parallel to said feed path.

4. An apparatus according to claim 2 in which said pulse generating means include a rotatable timing member which is arranged to rotate in synchronism with said one of said rollers and also include sensor means in cooperative relationship with said rotatable timing member, arranged to generate a series of timing pulses in response to rotation of said timing member and to apply said timing pulses to said data processing means, and in which in each of steps (a) and (c) said data processing means are arranged to sample the value of said output voltage in response to each timing pulse received during the relevant step.

5. An apparatus according to claim 1, in which said data processing means are arranged to compare said third value with a plurality of discrete ranges of values which are contained in a look-up table and which respectively correspond to different numbers of sheets, each range being spaced from each other range.

6. An apparatus according to claim 5, in which said data processing means are arranged to generate a signal indicative that the relevant single or multiple sheet is invalid in the event that said third value is found not to lie within any of said ranges, said signal serving to cause the invalid sheet to be diverted to a container for rejected sheets.

7. An apparatus according to claim 1 in which the diameter of said first roller is twice that of said second roller

8. An apparatus according to claim 1, also including a pivotally mounted rod on which said second roller is rotatably mounted, said rod being substantially fixed in position at one end, and further including a support structure and a connector member, which connector member is pivotally mounted on said support structure, to which connector member an end portion of said rod remote from said one end is connected, and which connector member is coupled to said voltage generating means, whereby the passage of a single or multiple sheet between said first and second rollers brings about pivotal movement of said connector member, said pivotal movement causing a variation in the output voltage of said voltage generating means.

9. An apparatus according to claim 8, also including a linear variable differential transformer which forms part of said voltage generating means, said transformer having an armature to which said connector member is connected, pivotal movement of said connector member in operation bringing about movement of said armature so as to cause a change in the output voltage of said voltage generating means.

10. An apparatus according to claim 1, also including means for detecting the passage of superposed currency notes along a feed path, said apparatus being arranged to perform a plurality of pick operations in the course of a cash dispensing operation, each pick operation involving picking a single or multiple note from a currency note container and causing the picked single or multiple note to pass between said rollers, and said data processing means being arranged, in the course of said cash dispensing operation, to store said first digital value prior to any picked currency note reaching said rollers, and being arranged to generate and store said second and third digital values for each single or multiple note which passes between said rollers in the course of said cash dispensing operation, said first digital value remaining unchanged for each said third value which is generated and stored.

* * * * *